Feb. 28, 1933.   G. R. BOTNEN   1,899,306
EARTH CONDITIONING IMPLEMENT
Filed Aug. 3, 1931   2 Sheets-Sheet 2

INVENTOR.
G. R. BOTNEN
BY
M. Talbert Dick
ATTORNEY

Patented Feb. 28, 1933

1,899,306

UNITED STATES PATENT OFFICE

GLENN R. BOTNEN, OF GILMAN, IOWA

EARTH CONDITIONING IMPLEMENT

Application filed August 3, 1931. Serial No. 554,797.

The principal object of my invention is to provide a novel field or road conditioning device that successfully drags, crushes, pulverizes and distributes the loam, dirt or like over which it is moved.

A further object of this invention is to provide a harrowing device that is moved over the ground by a minimum amount of energy and one that carries and comfortably transports the user.

A still further object of my invention is to provide a harrow supporting cart that may be easily and quickly folded with its plurality of harrow sections to permit its movement through a narrow gate or passageway.

A still further object of this invention is to provide a harrow device that may be easily turned at corners and one that is easily transported from place to place when not in use.

A still further object of my invention is to provide a harrow device that is free from clogging when operated over a field possessing weeds, straw, cornstalks or the like.

A still further object of this invention is to provide an earth conditioning implement that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

No doubt of all modern farm implements, the harrow is one of the oldest. However the harrows and drags now being used are not entirely satisfactory, due to the fact that they require much energy to move them across the field, are easily clogged by weeds, straw and the like, which impair their efficiency and do not permit the transportation of the used. Also the usual harrows are very unwieldy and are such elongated affairs that it is almost impossible to move them sidewise when taking them through narrow passageways. I have overcome such objections by providing a combination harrow and cart which not only is easily moved across the field with a minimum amount of energy, but may be easily transported from place to place.

Figure 1:
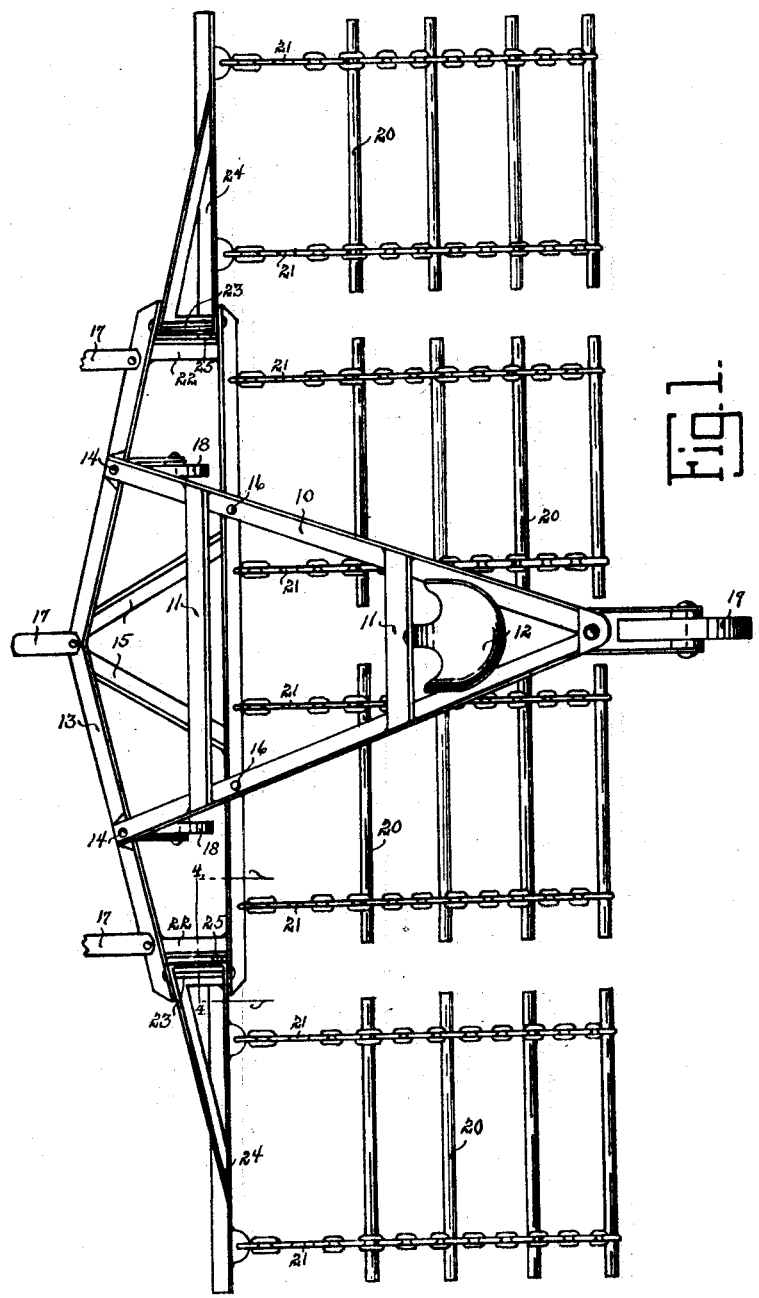
Fig. 1 is a top plan view of my complete invention ready for use.
Figure 3:
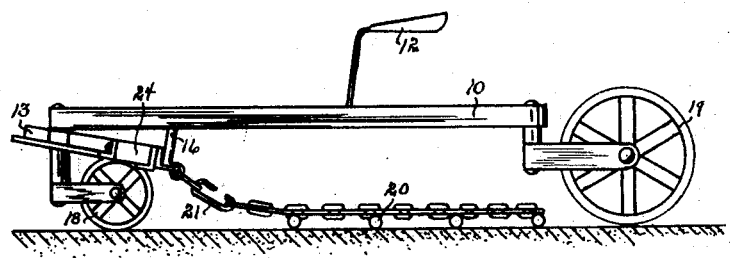
Fig. 3 is a side view of my earth conditioning implement in use.
Figure 4:
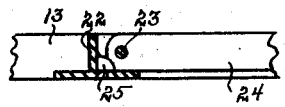
Fig. 4 is a front sectional view of the hinged portion of one of the wing extension arms and is taken on line 4—4 of Fig. 1.

Referring to the drawings, I have used the numeral 10 to designate the upper portion of the frame and which is of V-type construction, as shown in Fig. 1. This frame portion 10 may be strengthened by cross members which I have designated by the numeral 11. Secured on the rearward cross member 11 is an ordinary operator seat 12. By this construction when the operator is seated he will be in a strategic position directly behind the horses that are pulling the invention, or if the device is secured to a tractor he may easily control the same. The forward cross member 11 provides an excellent rest for the feet of the operator. The numeral 13 designates the lower frame portion which is secured to the forward end of the frame 10 by a suitable means such as rivets, bolts or the like 14. This frame 13 is principally constructed of two spaced apart beams, in between which are brace members 15, as shown in Fig. 1. It will here be noted that the rear beam is of lower altitude than the forward beam of the frame 13. The rear beam is rigidly secured to the frame 10 by vertical brace members 16, as shown in Fig. 3. Secured to the forward beam of the frame 13 may be any number of bars 17 designed for connecting double trees or like to the invention. In order that the device will be pulled evenly in a forward direction under normal conditions, I have caused the forward beam of the frame 13 to extend outwardly at its center, as shown in Fig. 1. The numeral 18 designates two caster wheels suitably swivelled to the frame 13. These caster wheels are spaced apart and are positioned below the two forward ends of the frame 11, respectively. By being castered and swivelly connected to the forward end of the frame 13, which they support, they may easily swing to travel in any direction irrespective of the position of the frames 10 and 13.

The numeral 19 designates a similar caster wheel, except of larger diameter and swivelly connected to the rear end of the frame 10, as shown in Fig. 3. This wheel 19 may also travel in any direction regardless of the position of the frame 10 to which it is secured and which it supports. The wheels 18 and 19 are so designed and secured to the frames that when the frame is being moved forwardly over comparatively level ground, the frame 10 will be in approximately a horizontal position.

Figure 2:
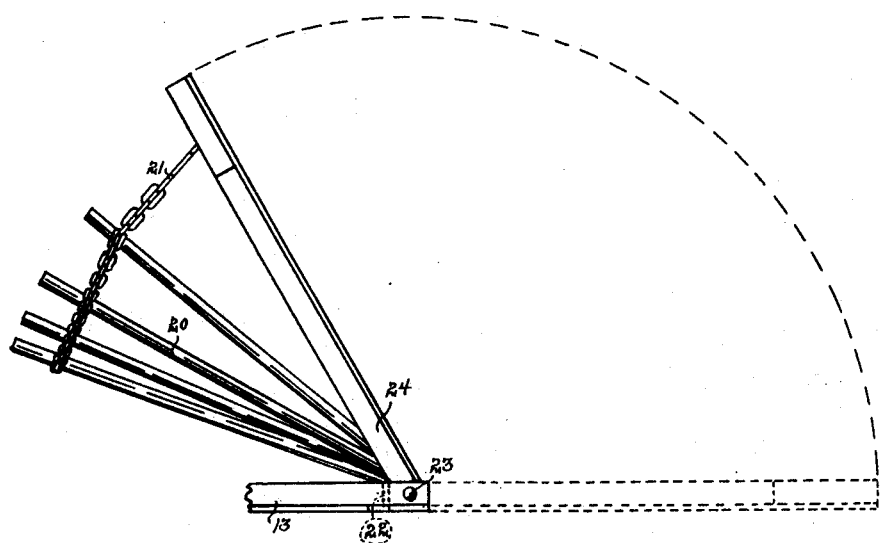
Fig. 2 is a front view of one of the extension arm wings in a folded position.

Secured to the rear beam of the frame 13 may be any number of harrow sections which I have generally designated by the numeral 20. These harrow sections may be of any style or design and may be of any number desired. They may be secured to their pulling beam by any suitable detachable means such as chains and chain hooks 21. Some distance from each of the two ends of each of the beams that make up the frame 13 is a connecting brace 22 binding the two beams rigidly together. To the outer side of each of these members 22 and extending between the two beams that make up the frame 13 is a shaft 23. Rotatably mounted at their inner ends on each of these two shafts 23 is a wing extending arm 24, as shown in Fig. 1. These extension arms may have their inner end portions of triangular construction for strength and to fill up the space between the two beams that make up the frame 13. By each being pivotally mounted to a shaft 23 it may have its outer end swung upwardly and over the frame 13, as shown in Fig. 2. The numeral 25 designates a lug or like on each of the cross braces 22 capable of engaging the inner lower end portion of the extension wing adjacent that brace for preventing the extension wing arms from assuming a position below a horizontal plane or the plane of the frame 13. Detachably secured to each of these hinged arms 24 is one or more detachable harrow sections 20.

By this construction a plurality of harrow sections may easily be used for ground conditioning work and they will all be pulled uniformly and evenly over the ground so being harrowed. When it is desired to move the invention from place to place or to take it through a narrow gate or passageway, it is merely necessary to swing each of the arm wings 24 to a folded position, as shown in Fig. 2. When the wing arms 24 are in a folded position, the harrow sections secured to them will also be swung upwardly and out of the way. If it is desired, however, the harrow sections may be quickly detached from the wing arms and either stored or if desired, auxiliarly carried on the frame. In some instances it may be desirable to harrow on very narrow paths and when this is the case the wing arms 24 should be moved to a folded position.

When it is again desired to use the harrow sections secured to the arms they should be swung to a lowered position as shown in Fig. 1.

By the frame 13 extending downwardly and to the rear, the forward end portions of the harrow sections will not be held too high from the ground being conditioned. However by the forward end portions of the harrow sections being held slightly higher than normal all trash, cornstalks and the like will easily pass under the harrow sections.

From the foregoing it will readily be seen that I have provided a very desirable earth conditioning device and one that may be easily turned at the corners.

Some changes may be made in the construction and arrangement of my improved earth conditioning implement without departing from the real spirit and purpose of my invention, and it is my intention to cover by my claims any modified forms of structure or use of mechanical equivalents which may be reasonably included within their scope.

I claim:

1. In a device of the class described, a frame, a second frame secured to said first frame and extending rearwardly and downwardly, wheels for supporting said frames, a plurality of harrow sections secured to said second mentioned frame, an extension wing arm hingedly secured to each end of said second mentioned frame, and a harrow section secured to each of said arms.

2. In a device of the class described, a frame, a second frame secured to said first frame and extending rearwardly and downwardly, wheels for supporting said frames, a plurality of harrow sections detachably secured to said second mentioned frame, an extension wing arm hingedly secured to each end of said second mentioned frame, and a harrow section detachably secured to each of said arms.

3. In a device of the class described, a frame of triangular construction, a caster wheel secured to the rear end of said frame, a second frame secured to the forward end portion of said first mentioned frame, two caster wheels for supporting said second mentioned frame, a wing member hingedly secured to each end of said second mentioned frame, brace members for strengthening said two mentioned frames, and earth engaging members secured to said wings and said second mentioned frame.

GLENN R. BOTNEN.